Dec. 8, 1959  F. L. MICHAELS, SR  2,916,127
PARKING METER MECHANISM
Filed Jan. 20, 1958  7 Sheets-Sheet 1

INVENTOR.
Frank L. Michaels, Sr.
BY
Wood, Herron & Evans
ATTORNEYS.

Dec. 8, 1959  F. L. MICHAELS, SR  2,916,127
PARKING METER MECHANISM
Filed Jan. 20, 1958  7 Sheets-Sheet 2

INVENTOR.
Frank L. Michaels, Sr.
BY
Wood, Herron & Evans.
ATTORNEYS.

Dec. 8, 1959   F. L. MICHAELS, SR   2,916,127
PARKING METER MECHANISM
Filed Jan. 20, 1958   7 Sheets-Sheet 4

INVENTOR.
Frank L. Michaels, Sr.
BY
Wood, Herron & Evans.
ATTORNEYS.

Dec. 8, 1959     F. L. MICHAELS, SR     2,916,127
PARKING METER MECHANISM

Filed Jan. 20, 1958     7 Sheets-Sheet 7

INVENTOR.
Frank L. Michaels, Sr.
BY
Wood, Herron & Evans
ATTORNEYS.

United States Patent Office 2,916,127
Patented Dec. 8, 1959

2,916,127

PARKING METER MECHANISM

Frank L. Michaels, Sr., Hebron, Ky., assignor to The Michaels Art Bronze Company, Inc., Erlanger, Kentucky, a corporation Application January 20, 1958, Serial No. 710,103

8 Claims. (Cl. 194—61)

The present invention relates to parking meter mechanisms of the type shown and described in my prior U.S. Patents Nos. 2,311,242 and 2,397,878 and has for its principal object the provision of a mechanism of this kind which is simplified and at the same time is of an enlarged utility to both the manufacturer and the purchasing municipalities because either of them may quickly adapt the mechanism to serve the wide variety of operational requirements demanded by the many different metered parking ordinances. For instance, the meter may readily be changed from suitability for use with pennies, nickels and dimes to a condition of suitability for use with nickels, dimes and quarters.

Another object of the invention is to provide a parking meter mechanism that remains accurate in its operation despite abusive or attempted illegal operation.

Still another object of the invention is to provide a meter mechanism that is adjustable to an exceptionally large number of specific operational requirements which may be effected in the field by a simple and rapid changeover.

A further object of the invention is to provide an improved time setting mechanism for a parking meter of this kind.

A still further object of the invention is to provide an arrangement in a meter of this type which is truly additive in registering the amount of parking time purchased by the insertion of a coin, regardless of the amount of time, if any, remaining from the prior inserted coin.

Other objects and advantages of the present invention will be apparent and best understood from the following description and accompanying drawings in which.

The parking meter mechanism as illustrated is of the manually operated type wherein, upon the deposit of a coin of appropriate value in the meter, the operator turns a handle on the front of the meter and thereby sets the meter to indicate the parking time purchased and simultaneously starts the timer running.

Figures 1, 2:
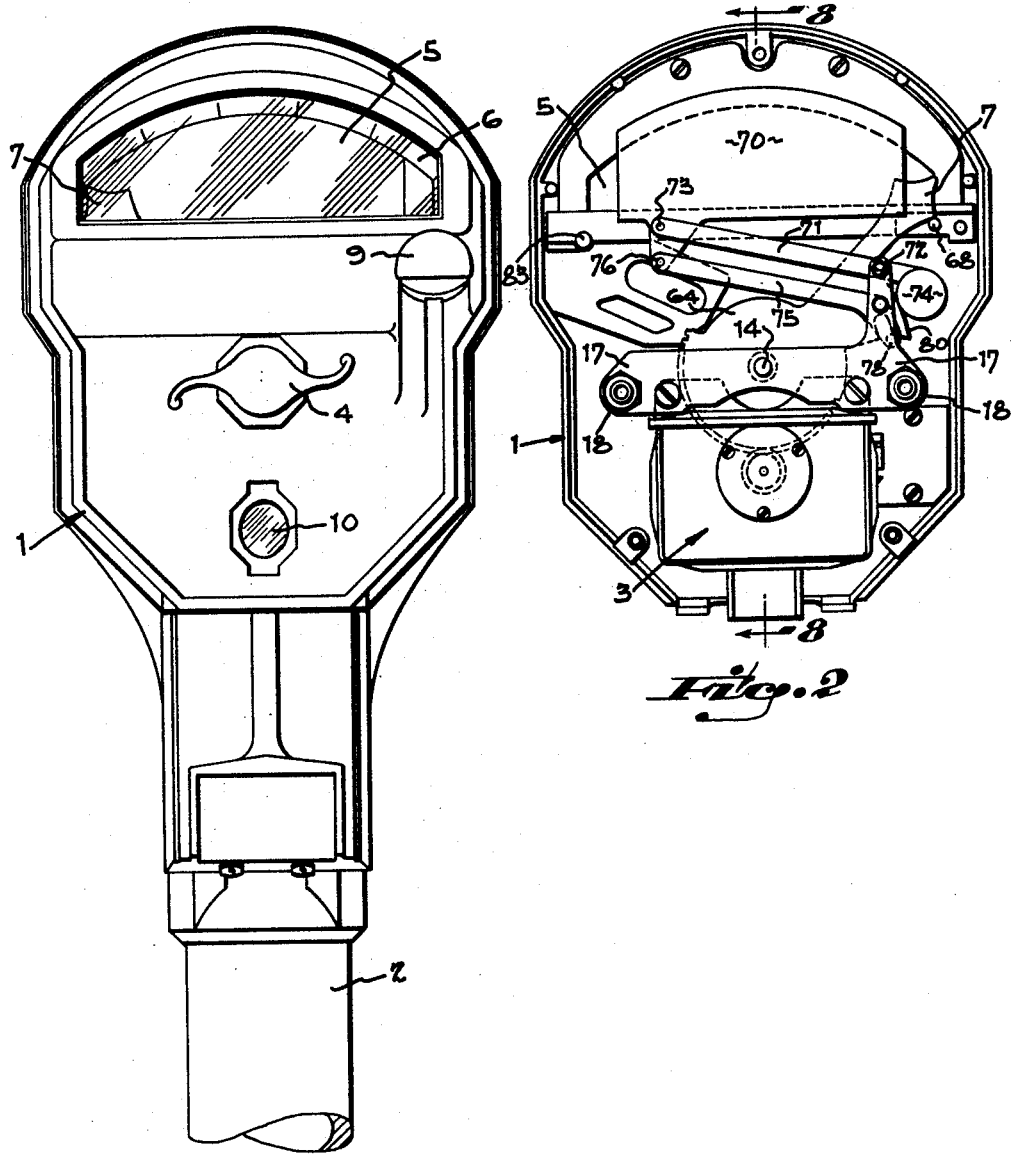
Figure 1 is a front elevational of the body of an assembled parking meter made in accordance with the invention.
Figure 2 is a back elevation of a meter having its back cover plate removed to show the internal mechanism constituting the invention.

As is shown in Figures 1 and 2, the metering mechanism is assembled on the chassis plate 1, which forms the front half of the meter body. The back half of the body (not shown) registers with the chassis plate so that together they constitute a sealed weatherproof body, which is adapted to be mounted upon a post 2.

The timing mechanism is run by a spring powered clock motor located within the body, the outer housing of which is indicated generally at 3. Such motors have long been known and used and will not be described here since the specifics of the motor itself constitute no part of the invention. The motor spring is wound by turning a crank 4, located on the outside of the chassis plate 1, where it is accessible to the operator. Because of limiting means later to be described, the crank can be turned only ineffectively unless a coin has been inserted in the meter. Consequently, the spring can be wound only when a coin has been inserted, and then it can be wound only in a precisely determined amount, so that under no circumstances can the clock be injured by overly tight winding.

In the upper portion of the chassis plate is a window having a transparent pane 5, through which is visible a dial 6, calibrated in units of time and an indicator arm 7 actuated by the motor 3 and movable over the dial 6, the indicator 7 and dial 6 together showing the amount of parking time remaining of that purchased by the operator. A coin may be inserted through an aperture being sheltered from the weather by a covering lip 9. When a coin has been inserted by the operator and the timer has been set, the coin is arrested by means later to be described in a position in which it is visible through a second window pane 10 located in the bottom portion of the chassis plate. The coin remains visible here until another coin has been inserted. This discourages users of "slugs" or similar devices, since any passerby can tell at a glance whether a false coin has been inserted.

Roughly speaking, the internal mechanism of the meter may be subdivided into three general groups or parts, each of which performs a particular function yet which interacts with the other two groups. In the exploded Figures 3 through 7, a coin-measuring or "sensing group" of parts is indicated generally at 11. It is the function of the sensing group to measure the diameter of a coin which has been inserted, to determine, in effect, whether the operator is entitled to a nickel, dime or quarter's worth of parking time. As an incident of its operation, this group of parts positions the inserted coin before the window 10. A second group, indicated at 12 in the drawings, may be called the "time-measuring" group. Its function is to set the timing clock so that the clock will measure off a nickel's worth of time when the sensing group 11 "tells" it that a nickel has been inserted, and so on for dimes and quarters. It must be remembered that the mere diameter of a coin cannot be taken as a direct measure of its value, since a nickel is worth less than a dime although it is larger in diameter than a dime. Consequently, there must be means for telling what coin has been inserted and independent means for measuring off time in accordance with the value of that coin. The sensing group provides the former means and the time-measuring group the latter means. A third group, indicated at 13, is the "indicating" group of parts. It is its function to visually indicate on the dial what amount of parking time remains of that purchased, and to tell when all the time has expired and a violation has occurred.

All three groups have as a common element a main shaft 14. Innermost on that shaft, that is, closest to the chassis plate, is the sensing group 11. Rearwardly of that is the time-measuring group 12, and outermost is the indicating group 13. In each of Figures 3 through 7, three views are shown looking down the shaft toward the chassis plate, each view taken at a different station on the shaft and each encompassing only one group of parts.

The main shaft 14 is concentric with and directly attached to the shaft 15 of the crank 4. The crank shaft 15 rotatably resides in a journal 16 extending through the chassis plate 1. The rear end of the main shaft resides in a journal in a frame 17 as is best seen in Figure 2. The frame 17 is held parallel to the chassis plate in spaced relation to it by means of spacing studs 18. The motor 3 is held by screw fastenings to the frame 17.

Figure 3:
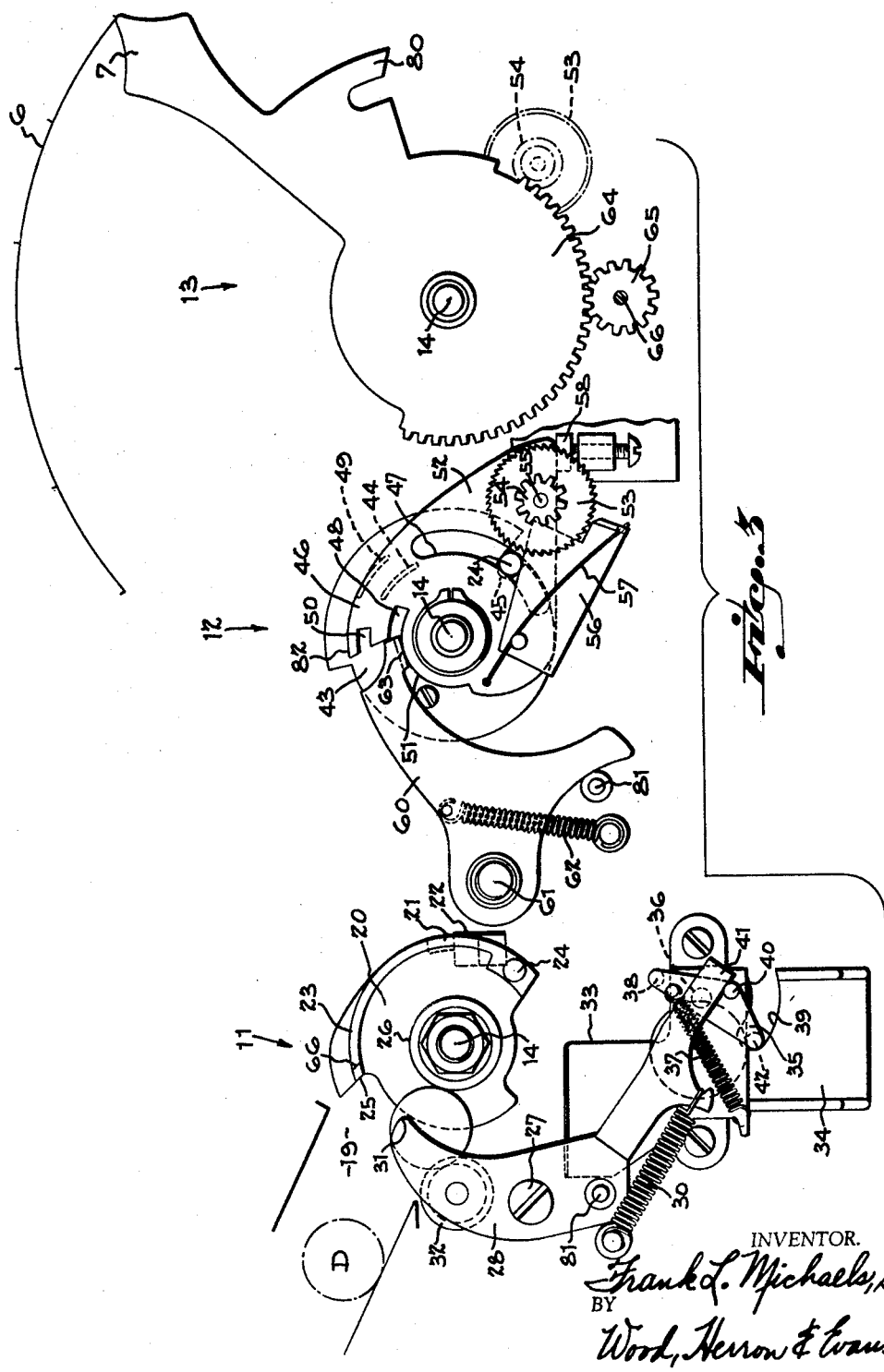
Figure 3 is an exploded view from the rear of the meter showing a dime being inserted.

As is seen in Figure 3, an inclined four-walled passageway 19 leads to the coin-sensing group of parts 11 from the aperture. An actuator plate 20 is mounted on the shaft 14 at its inner end. A torsion spring (not shown) is attached to the shaft 14 and exerts a clockwise torque on it (looking at the mechanism from the rear as in Figures 2 through 7). A spur 21 on the plate 20 butts against a stop 22 on the chassis plate 1 so as to limit the clockwise turning of the crank and shaft. Thus, unless a torque is applied to the crank, the torsion spring keeps the spur 21 butted against the rest 22. Under no circumstances can the crank 4 be rotated in a clockwise direction beyond the point where the spur butts against the rest. Furthermore, the crank can be rotated in a counter-clockwise direction only if a torque sufficient to overcome the spring bias is applied to it by the operator.

The plate 20 has an abutment skirt 23 along a segment of its periphery, a protruding driving stud 24, a coin pushing finger 25 and a spacing shoulder 26. Pivotably about an axle 27 is a two-armed sizing lever 28, biased by a spring 30 so as to tend to rotate in a clockwise direction. At the end of the upper arm of the lever 28 is a riding ear 31. A sensing wheel 32 is rotatably mounted on the lever 28.

The lower portion of the sensing group of parts includes a chute 33, and a spillway 34. A gate 35 is rotatable about a shaft 36, and a gate spring 37 urges the gate 35 to rotate counterclockwise about the shaft 36. Rotation of the gate in this direction is limited by a stop pin 38 which extends forwardly from the upper arm of the gate and butts against an arm of the chute 33. A rearwardly extending pin 40 on the gate rides against the extended lower arm 41 of the sizing lever 28. The sizing lever spring 30 is more powerful than the gate spring 37, so that arm 41 of the sizing lever, urged clockwise by spring 30, imparts a clockwise torque to the gate 35 against the counter-clockwise torque of the gate spring 37. Rotation of the gate in the clockwise direction is limited by a second forwardly extending stop pin 42 which comes into contact with the end of a slot 39 in the spillway 34. By limiting the clockwise swing of the gate 35, the pin 42 effectively limits the clockwise swing of the sizing arm 28.

Rearwardly of the sizing group on the main shaft 14 is the time measuring group 12. An alignment wheel 43 having raised guides 44 and 49 stamped into it rotatably resides on the main shaft 14. The wheel 43 has a notch 45 through which the driving stud 24 of the actuator plate 20 protrudes. Also rotatably residing about the shaft but positioned rearwardly of the alignment plate 43 is the time measuring plate 46. This plate has an arcuate slot 47 having the center of the shaft 14 as its center. The stud 24 extends through this slot. Open-ended time-measuring slots 48, 50 are cut into the plate 46, the inner edge of the inner slot 48 extending so as to provide a riding edge 51. On an extended ear 52 of the plate 46 is mounted a ratchet wheel 53 and on top of that a time-set gear 54. The wheel 53 and the gear 54 are secured together and both are rotatably journalled upon a stud shaft 55 which is secured to plate 46. A pawl 56 is pinned to the plate 46 and is urged by a spring 57 into engagement with the ratchet wheel 53. The teeth on the ratchet wheel 53 are so oriented that the wheel can be rotated clockwise but not counter-clockwise if the pawl is engaged with it. Clockwise rotation of the plate 46 is limited by an adjustable stop 58 which contacts the ear 52 of the plate. When the crank 4 is in its rest or unloaded position, the driving stud 24 bears against the pawl 56 transmitting via the spring 57 a clockwise torque to the plate 46, so that it normally rests against the stop 58. A two-armed time-measuring lever 60 is pivotable about a shaft 61 and is loaded by a spring 62 in a clockwise direction. A riding ear 63 at the end of the upper arm of the lever 60 is thereby urged into contact with the riding edge 51 of the plate 46, limiting the clockwise swing of the lever.

The indicating group of parts shown generally at 13 is located on top of the time-measuring group on the main shaft 14. The indicator 7 rotatably resides on the shaft and has a segmented gear 64 having the center of the shaft 14 at its center. Engaged with this gear are the time set gear 54 and a driving gear 65 which is connected directly to the motor 3 by a shaft 66.

Figure 4:
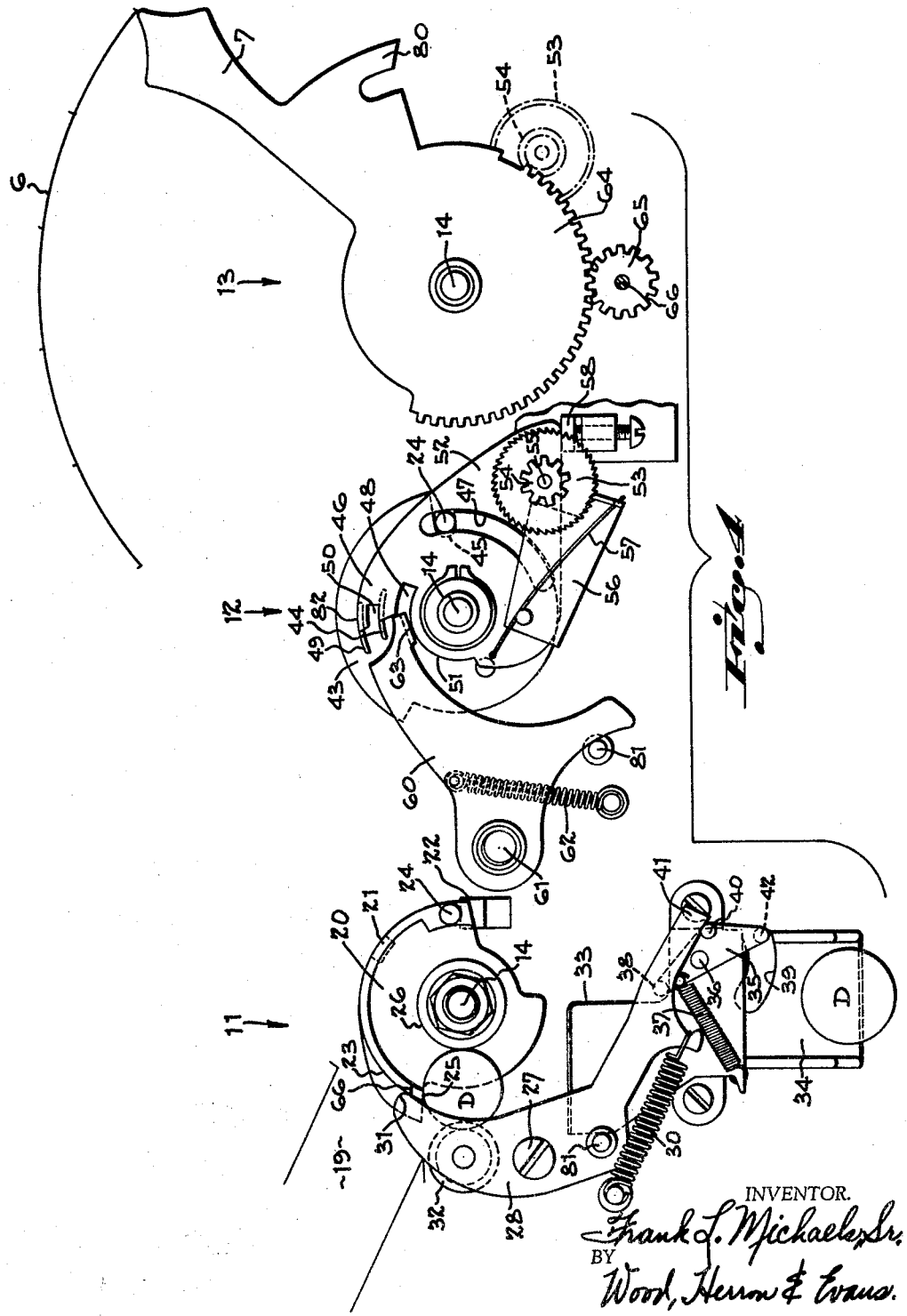
Figure 4 is an exploded view similar to Figure 3 showing a dime in contact with the sensing wheel which determines what coin has been inserted.
Figure 5:
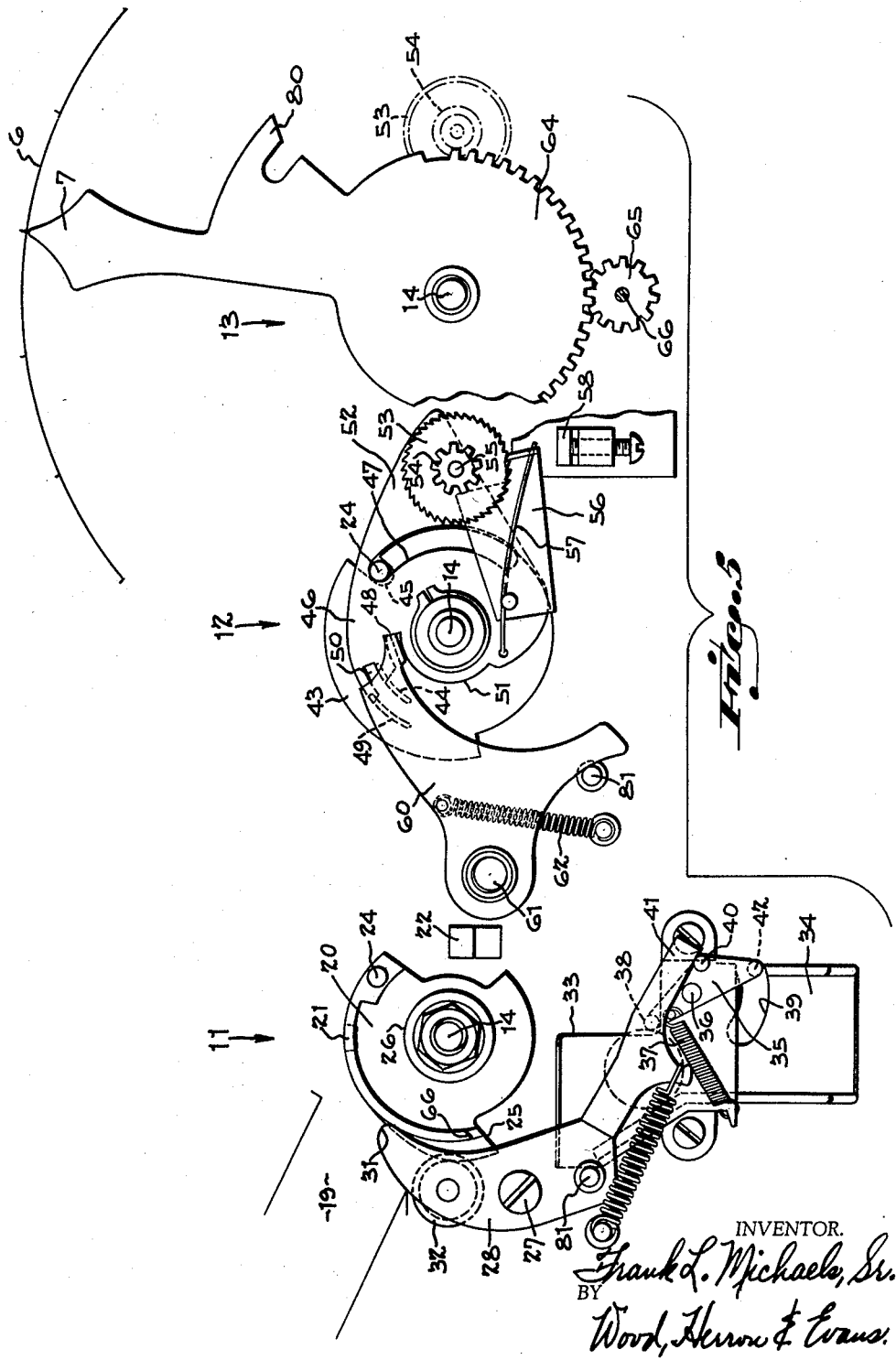
Figure 5 is an exploded view similar to Figures 3 and 4 showing the means whereby the time-indicating arm is moved the correct amount when a dime is inserted.

Further description is best undertaken in relation to the action of these parts as the mechanism is operated. Figures 3, 4 and 5 illustrate the workings of the mechanism when a dime is inserted in the meter. The coin rolls down the inclined passageway 19 and comes to rest peripherally supported by the spacing shoulder 26 and the sizing wheel 32, the distance between the two being less than the diameter of the dime. After inserting the coin, the operator then turns the crank 4 rotating the actuating plate 20 counter-clockwise. The coin pushing finger 25 contacts the coin and, as the crank is turned further, it pushes the coin in wedge fashion between the spacing shoulder 26 and the yieldably mounted sizing wheel 32, causing the sizing arm 28 to rotate counter-clockwise about its shaft 27. This is illustrated in Figure 4. As the lower arm 41 moves up, it ceases to exert any force on the pin 40 of the gate 35 with which it was in contact, so that the gate spring 37 rotates the gate 35 counter-clockwise until the upper stop pin 38 butts against the arm of the chute 33 preventing further rotation of the gate.

As the dime is pushed past the sizing wheel and the sizing lever 28 swings counter-clockwise, the riding ear 31 moves out so as to clear the end 66 of the abutment skirt 23, permitting the crank to be further rotated. It is apparent that if the operator attempts to turn the crank counter-clockwise without inserting a coin, the ear will not be moved away since there is no force acting to swing lever 28 and end 66 will butt against the ear 31 and prevent rotation in that direction. As was explained above, the spur 21 and stop 22 limit rotation in the other direction.

Figure 5 shows the mechanism after the dime has been pushed past the sizing wheel. The dime falls down the chute 33 and comes to rest against the stop pin 38 of the gate 35. Since no force now acts on the sizing wheel, the spring 30 causes the lever 28 to swing clockwise until the riding ear 31 comes into contact with the abutment skirt 23 on the actuating plate 20.

As the crank is being turned to push the dime past the sizing wheel, the driving stud 24 is moving counterclockwise in the slot 47 imparting no rotation to the plate 46. When the stud contacts the end of the slot, the plate then rotates with it. The ear 63 rides along the riding edge 51 into the open-ended slot 48. As the time-measuring plate 46 rotates, the rotation is imparted to the indicator 7 through the gear 54 engaged with the segment gear 64, because the pawl 56 is engaged with the ratchet wheel 53 preventing wheel 53 and gear 54 from rotating about their shaft 55. Finally, the contact of the ear 63 with the end of the slot 48 stops the rotation. It is the length of this slot that determines the number of minutes of parking time bought with the dime, since the slot determines the amount by which the indicator may be rotated. The time purchased is directly proportional to the length of the slot.

When the indicator 7 is rotated counterclockwise about the main shaft 14, the segment gear 64 turns the gear 65 clockwise. The shaft 66 on which the gear 65 is mounted is connected to the motor 3 and, turning in the clockwise direction, winds the spring of the motor.

The crank 4 is released when the end of slot 48 prevents further rotation. The torsion spring attached to the crank shaft 16 urges the shaft clockwise, turning it back until the spur 21 hits the stop 22. The stud 24 rides in the slot 47 until it contacts the pawl 56 at which point it imparts rotation to the time-measuring plate 46 through the spring 57. When this occurs, the ear 63 rides back out of the slot 48. The motor 3 through gear 65 holds the indicator at the point at which it was set, and now gear 54 rolls clockwise along the fixed segment gear 64, the ratchet wheel 53 being rotatable in that direction. The plate 46 continues to be rotated until ear 52 hits the stop 58. The actuator plate 20 rotates a bit farther before spur 21 hits its stop 22, so that the stud 24 pushes on the pawl 56, disengaging it from the ratchet wheel 53. Simultaneously the ear 31 rides along skirt 23 until it comes off the skirt end 66, when the spring 30 swings lever 28 clockwise. The lower arm 41 of the lever bears against pin 40 of the gate, imparting a clockwise rotation to the gate, about axle 36. Stop pin 42 swings in slot 39 until it contacts the end of the slot, stopping the swing of the gate and the swing of lever 28. The dime rests on the pin 42 above the spillway 34 and in the window 10 in the chassis plate. It remains here until another coin is inserted and lever 28 is rotated by the sizing wheel, permitting spring 37 to swing gate 35 counterclockwise, thus moving pin 42 out from underneath the coin. Then the coin falls down the spillway 34 into a bin (not shown) below in the post 2.

The motor 3 which has been wound by the clockwise rotation of gear 65 imparted by counterclockwise movement of the segment gear 64, now drives gear 65 counterclockwise. The driving gear rotates the segment gear clockwise, and the indicator 7 measures off the parking time remaining. Gear 54 driven by the segment gear 64 rotates counterclockwise, the pawl 56 having been disengaged from the ratchet wheel 53 by the pressure of the stud 24 on it. The indicator 7 ticks off time until it gets back to its starting position at the right end of the scale 6 (looking from the rear) when it butts against a pin 68 preventing movement beyond the zero point. This prevents further clockwise rotation of the segment gear 64, and the motor is stopped, the spring having unwound just the amount it was wound. Thus there is no load remaining on the spring. In this position the indicator comes into contact with an arm having a red "violation" sign attached, indicated generally at 70, moving the arm so that the sign is moved upwardly where it becomes visible through window 5. The sign mechanism is the subject of my Patent No. 2,311,242 of February 16, 1943. As is more completely disclosed therein, the operation of violation signal 70 is effected by pivoting a lever 71 on a fixed pivot 72 closely adjacent one end of the lever and pivoting the opposite end of the lever at 73 upon the bottom of the signal member 70. Counterweight 74 on lever 71 closely adjacent to pivot 72 allows the signal 70 to have but a slight overbalance of weight which will cause the signal to normally descend. A second lever 75 has its end pivoted at 76 immediately below pivot 73. A pin 78 in the free end of lever 75 is engageable by a finger 80 formed on the indicator 7. Lever 75 holds the signal at all times in a vertical position, and the engagement of the pin 78 by the finger 80 on the indicator allows the mechanism driving the hand clockwise to raise the violation signal at the proper time.

Figure 6:
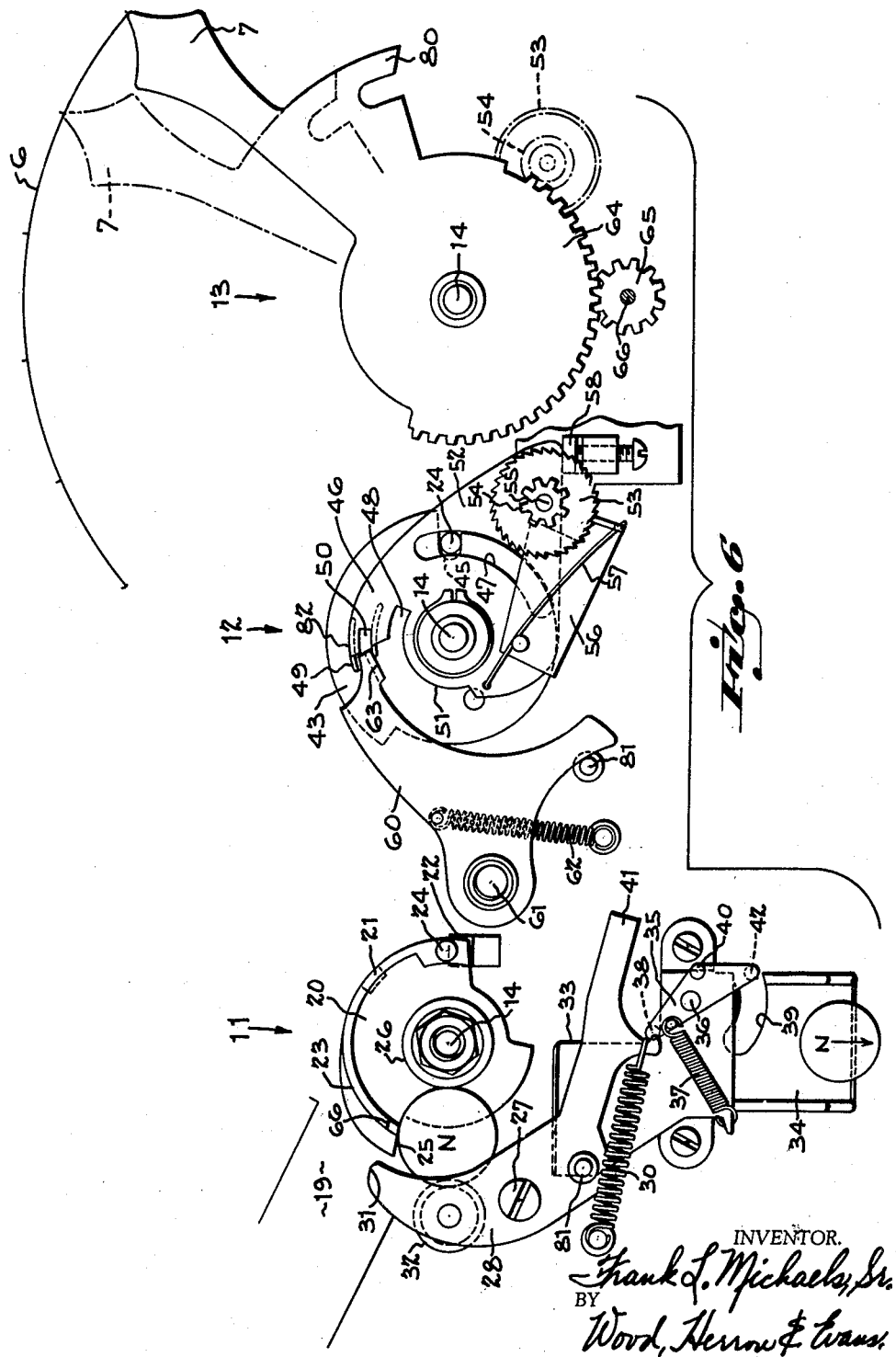
Figure 6 is an exploded view similar to Figure 4 but showing a nickel in contact with the sensing wheel.

The action of the metering mechanism when the operator inserts a nickel in the parking meter is illustrated in Figure 6. The action is in all ways similar to that above described, except that the nickel, being of a larger diameter than a dime, pushes the sizing wheel 32 farther away from the spacing shoulder 26 as the actuating plate 20 is rotated. As the sizing lever 28 swings, a stud 81 on the lever contacts the lower arm of the lever 60, causing that lever to swing counterclockwise about its pivot 61, so that the ear 63 moves away from the riding edge 51 to a position in which it is engageable with slot 50. The guide 44 on alignment wheel 43 aligns the ear 63 so that it is guided into slot 50 as the plate 46 is rotated further. The "nickel slot" 50 is of such a length that it will permit the plate 46 to be turned through only half as many degrees of arc as the "dime slot" 48 permits it to be turned. Since the plate turns only half as much as it does when a dime has been inserted, the gear 54 turns only half as much, and likewise the indicator is turned only half as much with the result that the timer measures off only half as much time as in the former instance. When the end of slot 50 butts against the ear 63 preventing further rotation, the crank is released and as the plate 46 rotates clockwise, the ear moves back out of the slot and lever 60 is swung by spring 62 so that the ear 63 again is in contact with riding edge 51. In all other respects the operation is similar to that previously detailed.

Figure 7:
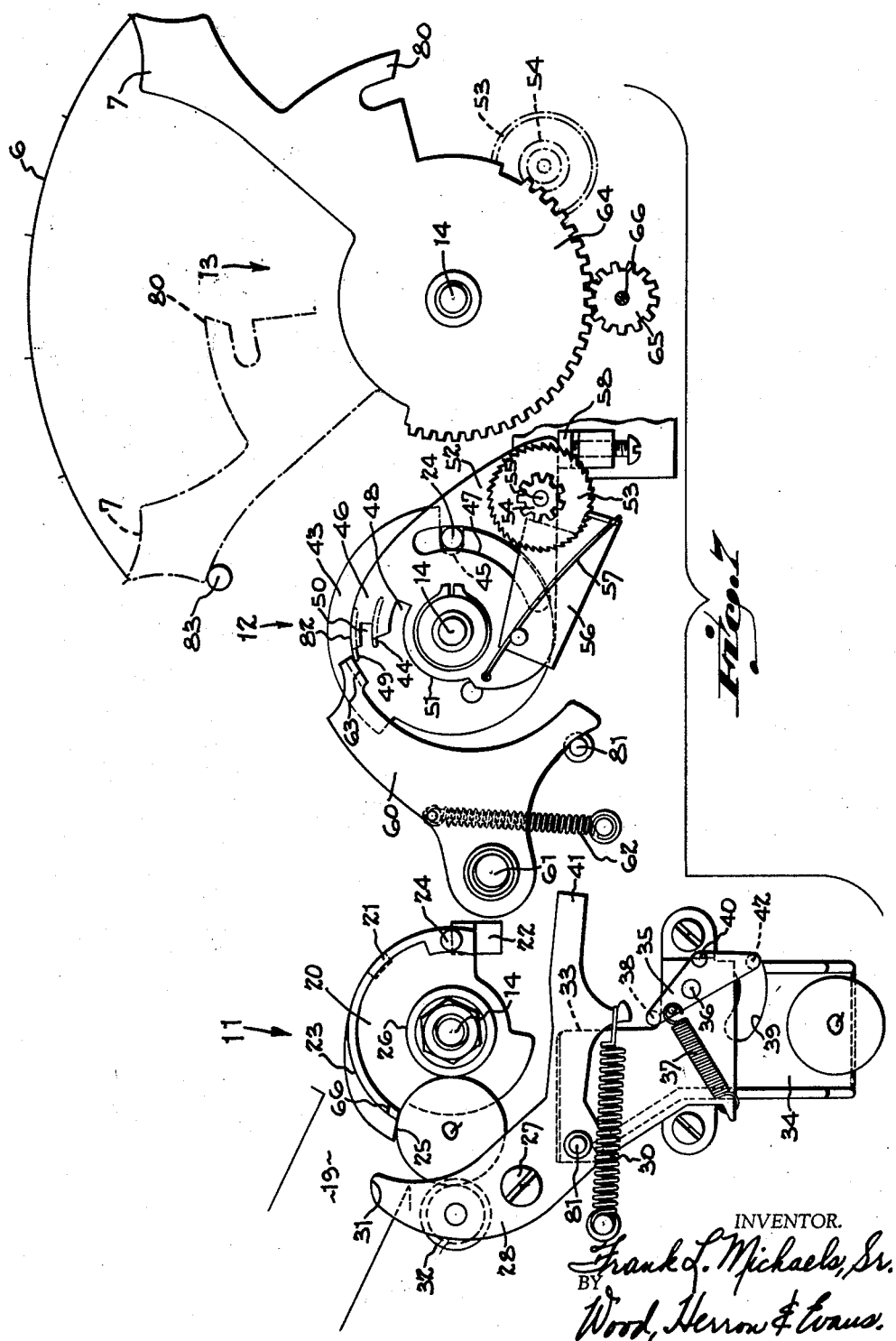
Figure 7 is an exploded view similar to Figures 4 and 6 but showing a quarter in contact with the sensing wheel.
Figure 8:
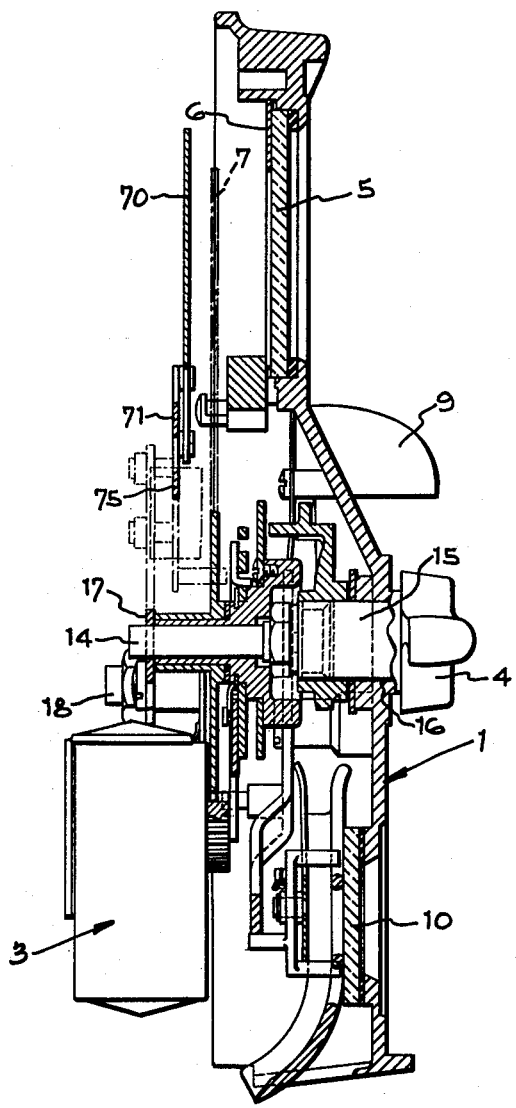
Figure 8 is a sectional view taken along line 8—8 of Figure 2.

When a quarter has been inserted, the sizing wheel 32 is swung still further from the spacing shoulder 26, since the quarter is of a diameter greater than that of either a dime or a nickel. This being so, the stud 81 swings more, causing the ear 63 to swing out past the "nickel slot" 50 to the "quarter rim" 82 of the time-measuring plate 46. The outer guide 49 leads the ear 63 so that it clears the corner of the rim 82 and rides against the rim resiliently kept in contact with the rim by the spring 62. There being no stop on the quarter rim 82, the plate 46 may be rotated until the indicator 7 is arrested by a pin 83 protruding from the chassis plate 1 at the extreme left side of the dial 6. The pin 83 is so located that when the ear 63 rides on the quarter rim 82 the indicator may be swung through an arc five times as long as that through which it moves when a nickel is inserted, and 25/10 times as far as that through which it moves when a dime is inserted. This is illustrated in Figure 7.

From the foregoing, it is apparent that the diameter of the coin inserted determines the swing of the sizing lever 28 and thereby the particular slot or rim with which the ear 63 comes into contact, there being a unique slot for each denomination of coin with which the meter is intended to be operated. The length of the slot in which the ear rides, or the position of the pin 83 in the case of a quarter, determines the amount of swing of the indicator and the amount of time purchased. In other words, the radial position of a slot is solely a function of the diameter of the corresponding coin, whereas the length of a slot is a function of the value of the coin.

Simply by varying the radial positions and the lengths of the slots in the time measuring plate the meter may be adapted for operation with coins as desired, provided only that no two coins of different value have identical diameters. Although herein a meter adapted for use with nickels, dimes and quarters has been described, it is seen that a meter could readily be adapted to use pennies, nickels and dimes. In a time-measuring plate designed for pennies, nickels and dimes, the dime slot would be innermost, i.e., closest to the center, of the plate, the penny slot next, and the nickel slot outermost. The arc length of the nickel slot would be five times the arc length of the penny slot and the dime slot arc would be ten times it.

The advantage of such simple convertibility of the meter is that one standard model may be kept in stock, it being adapted for use with any desired combination of coins merely upon the substitution of a properly slotted time-measuring plate.

The pin 83 determines the maximum possible swing of the indicator and therefore the maximum parking time that can be purchased by the operator.

One advantage of the invention over prior parking meters is that it is truly additive. A nickel always registers a nickel's worth of time regardless of the amount of time remaining, if any, from the prior inserted coin, except, of course for the limitation imposed by the finite length of the scale 6. For example, suppose a dime is inserted, purchasing, let us assume, an hour's parking time. Thirty-five minutes expire so that twenty-five minutes remain. At this point a nickel is inserted. A conventional meter would then be reset at 30 minutes, rather than at 55 minutes as it ought to, since such meters can be set only at specified amounts. From the above description, it will be seen that the particular arrangement of the timer and indicator of the invention permits the indicator to be reset so as to give exactly the right amount of time regardless of its position over the dial.

Having described my invention I claim:

1. In a manually operated parking meter adapted to receive coins of different sizes having different values, said meter having a main shaft and an indicator rotatably mounted upon said main shaft, the improved means to move said indicator into time setting positions which are directly related to the values of coins inserted into the meter, said means comprising an actuator fixed to said shaft for rotation therewith, a finger presented by said actuator, an annular shoulder on said actuator, coin measuring means pivotally mounted for swinging movement about an axis paralleling said main shaft, coin engaging means carried by said coin measuring means and normally being positioned adjacent to said annular shoulder such that coins dropped into the meter are received and arrested between the coin engaging means and said annular shoulder with the periphery of the coin in contact with them, whereby upon rotation of the actuator a coin so received and arrested is rolled between them by said finger thereby camming the coin engaging means and the coin measuring means radially outwardly from the shaft, means responsive to outward movement of the coin measuring means having a stop thereon movable into radial positions with respect to the shaft, which positions are related to the sizes of coins, a time measuring means rotatably mounted upon the shaft, lost motion means interconnecting the actuator and the time measuring means, whereby the actuator may be rotated through an initial arc of rotation before the time measuring means moves with the actuator, a series of arcuate slots in the actuator positioned in accordance with the radial positions of said stop, said slots being capable of receiving said stop, the length of each slot bearing a direct relationship to the value of a coin such that rotation of the actuator past the initial arc of rotation until the stop engages the end of a slot is directly related to the value of a coin, means interconnecting the time measuring means and indicator whereby the indicator moves a distance corresponding to the arc of movement of the time measuring means, and abutment means on the coin measuring means and the actuator engageable to prevent movement of the actuator past said initial arc of rotation in the event no coin is present between the coin engaging member and the annular shoulder.

2. In a manually operated parking meter adapted to receive at least two coins of different sizes having different values, said meter having a main shaft and an indicator rotatably mounted upon said main shaft, the improvement to limit the degree of movement of the indicator in a time setting direction comprising an actuator plate fixed to said shaft and adapted to be manually rotated in a time setting direction, said actuator plate presenting a coin-pushing finger, pivotally mounted coin measuring means having a stop thereon normally positioned to engage the actuator plate and prevent manual rotation thereof in the time setting direction, an annular shoulder on the actuator plate, a sensing wheel mounted upon said coin measuring means, the annular shoulder and sensing wheel normally being spaced to receive and arrest coins between them such that in the initial rotation of the actuator plate said finger contacts the coin and rolls said coin into camming relationship with said sensing wheel to pivot said coin measuring means radially outwardly and thereby move the stop carried by the coin measuring means out of the way of the actuator plate and permit continued rotation of the actuator plate, a pivotally mounted sizing lever responsive to radial movement of the sensing wheel, a stop carried by said sizing lever and movable into positions radially spaced from the central axis of said main shaft dependent upon the size of the coin cammed between the sensing wheel and said annular shoulder, a time measuring plate rotatably mounted upon said main shaft and in driving connection with said actuator plate, at least two arcuate slots in said time measuring plate positioned concentrically with respect to the central axis of said shaft, the concentric positions of the slots being related to the sizes of said coins such that one coin, being cammed between the sensing wheel and annular shoulder positions the stop carried by the sizing lever to be received by one slot and the other coin positions said stop to engage the other slot, the lengths of said slots bearing a direct relationship to the values of the coins, such that the ends of the slots constitute abutment means to stop the rotation of the time measuring plate in relationship to the value of an inserted coin, and means interconnecting the time measuring plate and the indicator so that upon movement of the main shaft in said time setting direction the indicator is swung through an arc the length of which is directly related to the value of the inserted coin.

3. In a manually operated parking meter adapted to receive coins of different sizes having different values, said meter having a main shaft and an indicator rotatably mounted upon said main shaft, said indicator movable manually in one direction to time indicating positions and movable in the opposite direction by clock mechanism to a zero position, the improved means to limit the manual movement of said indicator at various time indicating positions which are directly related to the values of coins inserted into the meter, said means comprising an actuator fixed to said shaft and rotatable therewith, a finger presented by said actuator, movable coin measuring means having a stop thereon normally positioned to engage said actuator and limit the amount it can be rotated to a short initial movement ineffective to move the indicator, an annular shoulder on said actuator, a coin engaging member on said coin measuring means, said coin engaging member normally positioned with respect to the annular shoulder a distance to receive and arrest a coin deposited in the meter such that the periphery of the coin makes contact with the member and the shoulder and such that, upon rotation of the actuator, said finger cams the coin between the shoulder and member to first move the stop carried by the coin measuring means out of the way of the actuator to free the actuator for rotative movement beyond said initial movement and then moves the stop into a position in which said stop is spaced radially outwardly away from said shaft a distance directly related to the diameter of the deposited coin, means responsive to outward movement of said coin measuring means having an ear thereon movable into radial positions with respect to said shaft, which positions are related to the sizes of the coins, a time measuring member rotatably mounted upon said shaft and movable with said actuator, an abutment on said time measuring member positioned radially thereof at a distance corresponding to the radial position of said ear said abutment positioned angularly of the time measuring member in accordance with the value of the deposited coin such that the time measuring member may be rotated an amount which is related to the value of said coin, and means interconnecting the indicator and time measuring means.

4. In a manually operated parking meter adapted to receive coins of different sizes having different values, said meter having a main shaft and an indicator rotatably mounted upon said main shaft, the improvement comprising an actuator fixed to said shaft for rotation therewith, a coin-pushing finger presented by said actuator, an annular shoulder on said actuator, coin measuring means pivotally mounted for swinging movement about an axis paralleling said main shaft, coin engagement means on said coin measuring means normally positioned with respect to said annular shoulder to arrest a coin inserted into the meter in a position such that upon rotation of the actuator, said finger cams the coin against the coin engagement means to swing the coin measuring means away from the main shaft a distance which is directly proportionate to the size of said coin, limiting means responsive to outward movement of said coin measuring means, time measuring means rotatable with said actuator on the main shaft including a plurality of stops, said stops positioned radially of the time measuring means corresponding to the various positions of said limiting means as dictated by the various sizes of the coins received by the meter, said stops being positioned angularly of the time measuring means as dictated by the values of said coins, abutment means carried by said limiting means engageable with said stops, and means interconnecting the actuator and the indicator whereby the arc of rotation permitted the actuator by said abutment means is directly reflected in indicator movement.

5. The improved means as set forth in claim 4 in which there are provided arcuate guide means positioned to guide the said abutment means into precise alignment with the stops on the time measuring means.

6. The improvemnet as set forth in claim 4 in which lost motion means are provided to interconnect the time measuring means with the actuator, whereby the actuator may be rotated through an initial arc of movement before the time measuring means moves with the actuator.

7. The improvement as set forth in claim 4 in which a clock motor is provided to return the indicator to a zero position and gear means interconnecting the indicator and the clock motor to wind said clock during movement of the indicator away from said zero position.

8. In a manually operated parking meter adapted to receive coins of different sizes and different values, said meter having a rotatable shaft which is spring biased in a first direction and having a handle thereon for moving the shaft manually in a second direction constituting a time setting direction, the improved means to limit the time setting movement of the indicator in relation to the values of coins inserted into the meter, said means comprising an actuator affixed to said shaft for rotation therewith, coin measuring means having a stop thereon normally engageable with the actuator to limit movement of the actuator in the time setting direction to an initial arc of movement which is ineffective to move said indicator, coin engaging means mounted upon said coin measuring means, coin-pushing means presented by said actuator an annular shoulder on said actuator, the coin engaging means and annular shoulder being relatively positioned to receive and arrest a coin inserted into the meter between them, said coin-pushing means during the initial arc of movement of the actuator camming the coin between the annular shoulder and the coin engaging means to move the coin measuring means radially outwardly with respect to the shaft and free the actuator for continued movement, movable stop means responsive to movement of the coin measuring means for movement into positions spaced radially from the shaft, the radial positions being dependent upon the sizes of coins cammed between the coin engaging means and said annular shoulder, time measuring means rotatably mounted upon the shaft adjacent to the actuator, lost motion means interconnecting the actuator and the time measuring means arranged so that the time measuring means moves with the actuator only after the initial arc of movement of the actuator, a plurality of stops angularly positioned on the time measuring means to move through arcuate paths during movement of the time measuring means, the paths corresponding to the various radial positions of said movable stop means as directed by the coin measuring means, said indicator rotatably mounted upon the shaft adjacent to said time measuring means and having an arcuate gear segment thereon, a gear rotatably journalled upon said time measuring means and meshing with said gear segment, a ratchet fixed to said gear, a pawl engageable with said ratchet during movement of said shaft to lock said ratchet such that rotation of the time measuring means rotates the indicator, clock mechanism, a gear rotatable to wind said clock mechanism, said gear being in mesh with the gear segment on the indicator such that time setting movement of the indicator winds said clock, and means whereby said panel and ratchet are disengaged upon the release of said handle whereby the gear on the time measuring means is thereafter permitted to roll on the gear segment when the actuator is returned from a time setting position during the unwinding of said clock.

References Cited in the file of this patent
UNITED STATES PATENTS
2,563,182    Michaels _____ Aug. 7, 1951